US007312795B2

(12) United States Patent
Aso et al.

(10) Patent No.: US 7,312,795 B2
(45) Date of Patent: Dec. 25, 2007

(54) IMAGE DISPLAY APPARATUS AND METHOD

(75) Inventors: Takashi Aso, Kanagawa (JP); Hiroaki Sato, Tokyo (JP); Masahiro Suzuki, Kanagawa (JP); Toshihiro Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 10/945,994

(22) Filed: Sep. 22, 2004

(65) Prior Publication Data

US 2005/0068314 A1    Mar. 31, 2005

(30) Foreign Application Priority Data

Sep. 30, 2003  (JP)  ............................. 2003-341628

(51) Int. Cl.
*G06T 15/00* (2006.01)
(52) U.S. Cl. ...................... 345/419; 345/629; 345/589; 345/632; 345/633; 382/154; 715/757
(58) Field of Classification Search ................ 345/629, 345/630, 419, 589, 632, 633; 382/154; 715/757
See application file for complete search history.

(56) References Cited

U.S. PATENT DOCUMENTS

| 6,330,356 | B1 * | 12/2001 | Sundareswaran et al. ... 382/154 |
| 6,438,263 | B2 * | 8/2002 | Albeck et al. ............... 382/154 |
| 6,522,312 | B2 | 2/2003 | Ohshima et al. ................ 345/8 |
| 6,803,928 | B2 * | 10/2004 | Bimber et al. .............. 715/757 |
| 2003/0179361 | A1 | 9/2003 | Ohtomo et al. ............ 356/4.01 |
| 2003/0185416 | A1 | 10/2003 | Sugiura ....................... 381/424 |
| 2004/0104935 | A1 * | 6/2004 | Williamson et al. ........ 345/757 |

FOREIGN PATENT DOCUMENTS

| CN | 1413566 | 4/2003 |
| JP | 11-136706 A | 5/1999 |

OTHER PUBLICATIONS

Gomes de Sa et al. "Virtual reality as a tool for verification of assembly and maintenance processes", 1999.*
"An Augmented Reality System Using a Real-time Vision Based Registration" Okuma et al., Pattern Recognition, 1998. Proceedings. Fourteenth International Conference on Brisbane, QLD. Australia Aug. 16-20, 1998, Los Alamitos, CA, USA, IEEE Comput. Soc, US, Aug. 16, 1998, p. 1226-1229.

* cited by examiner

*Primary Examiner*—Kimbinh T. Nguyen
(74) *Attorney, Agent, or Firm*—Fitzpatrick, Cella, Harper & Scinto

(57) ABSTRACT

Image display method of superimposing virtual space image data on real space image data at an arbitrary viewpoint and exhibiting the superimposed image to a viewer is provided. When real space image data, including a prototype generated based on three-dimensional CAD data, is captured by an image sensing device, the position and orientation of the image sensing device and the prototype are tracked, and position/orientation data indicative of the position and orientation of the prototype in the image is acquired. Based on the position/orientation data and the three-dimensional CAD data, a three-dimensional computer graphic image is rendered so as to overlap the prototype in the image, thereby synthesizing the image with the three-dimensional computer graphic image. The synthesized image is then displayed.

5 Claims, 17 Drawing Sheets

IMAGE DISPLAY APPARATUS AND METHOD

FIELD OF THE INVENTION

The present invention relates to an image display apparatus and method employed in a mixed reality system, which exhibits a viewer image data in virtual space superimposed on image data in real space at an arbitrary viewpoint.

BACKGROUND OF THE INVENTION

The mixed reality system provides a user with a synthesized image, which is obtained by synthesizing a real space image with a virtual space image generated in accordance with a user's viewpoint position, visual line direction, and so forth. The mixed reality system can give a viewer a sense that as if a virtual object really exists in real space. Compared to a conventional virtual reality system (VR system), more realistic and full-scale viewing is possible (refer to Japanese Patent Application Laid-Open No. 11-136706).

Meanwhile, in the design and production field, designing (shapes and designs) by a three-dimensional CAD is prevailing. The mainstream method of evaluating an object designed by a three-dimensional CAD includes a method that visually evaluates the object by displaying data (solid type) generated by a three-dimensional CAD on a computer screen as three-dimensional computer graphics (hereinafter referred to as a 3D-CG), or a method that visually and tactually evaluates the object by generating a simple prototype (simple mockup) using a rapid prototyping device or the like.

However, the method of displaying three-dimensional CAD data on a computer screen as a 3D-CG merely allows evaluation in virtual space, and it is impossible to evaluate an object as a full-scale object in real space. Furthermore, the method of generating a simple prototype (simple mockup) by a rapid prototyping device is effective for grasping a rough shape of an object under the constraints of processing precision, materials and so on, but it does not reproduce detailed information, e.g., the detailed design and shape, colors and so on, designed by the 3D-CAD. Therefore, there is a demand for a method that can evaluate design data under the condition close to a finished product.

SUMMARY OF THE INVENTION

The present invention has been proposed in view of the conventional problem, and has as its object to enable design evaluation under the condition close to a finished product with the use of a mockup produced as a simple prototype.

In order to attain the above object, the present invention provides an image display method of superimposing image data of virtual space on image data of real space at an arbitrary viewpoint and exhibiting a superimposed image to a viewer, comprising: an image sensing step of capturing, by an image sensing device, image data of real space including a prototype generated based on three-dimensional CAD data; a tracking step of tracking a position and orientation of the image sensing device and the prototype, and acquiring position/orientation data indicative of the position and orientation of the prototype in an image obtained in the image sensing step; and a synthesizing step of rendering a three-dimensional computer graphic image based on the position/orientation data and the three-dimensional CAD data so as to overlap the prototype in the image obtained in the image sensing step, thereby synthesizing the image with the three-dimensional computer graphic image.

Furthermore, in order to attain the above object, an image display apparatus according to another aspect of the present invention has the following configuration. More specifically, the present invention provides an image display apparatus for superimposing image data of virtual space on image data of real space at an arbitrary viewpoint and exhibiting a superimposed image to a viewer, comprising: an image sensing unit configured to capture image data of real space including a prototype generated based on three-dimensional CAD data; a tracking unit configured to track a position and orientation of the image sensing unit and the prototype, and acquire position/orientation data indicative of the position and orientation of the prototype in an image obtained by the image sensing unit; and a synthesizing unit configured to render a three-dimensional computer graphic image based on the position/orientation data and the three-dimensional CAD data so as to overlap the prototype in the image obtained by the image sensing unit, thereby synthesizing the image with the three-dimensional computer graphic image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

In the mixed reality system according to the first embodiment which will be described below, a photographed image of a simple prototype (simple mockup), which is generated by a rapid prototyping device based on three-dimensional CAD data, is superimposed on three-dimensional CG (3D-CG) data generated by converting the same three-dimensional CAD data, and their positions and orientations are matched and displayed in the mixed reality system. This system realizes both visual evaluation and tactual evaluation, thus enabling evaluation under the condition close to a finished product.

Figure 1:
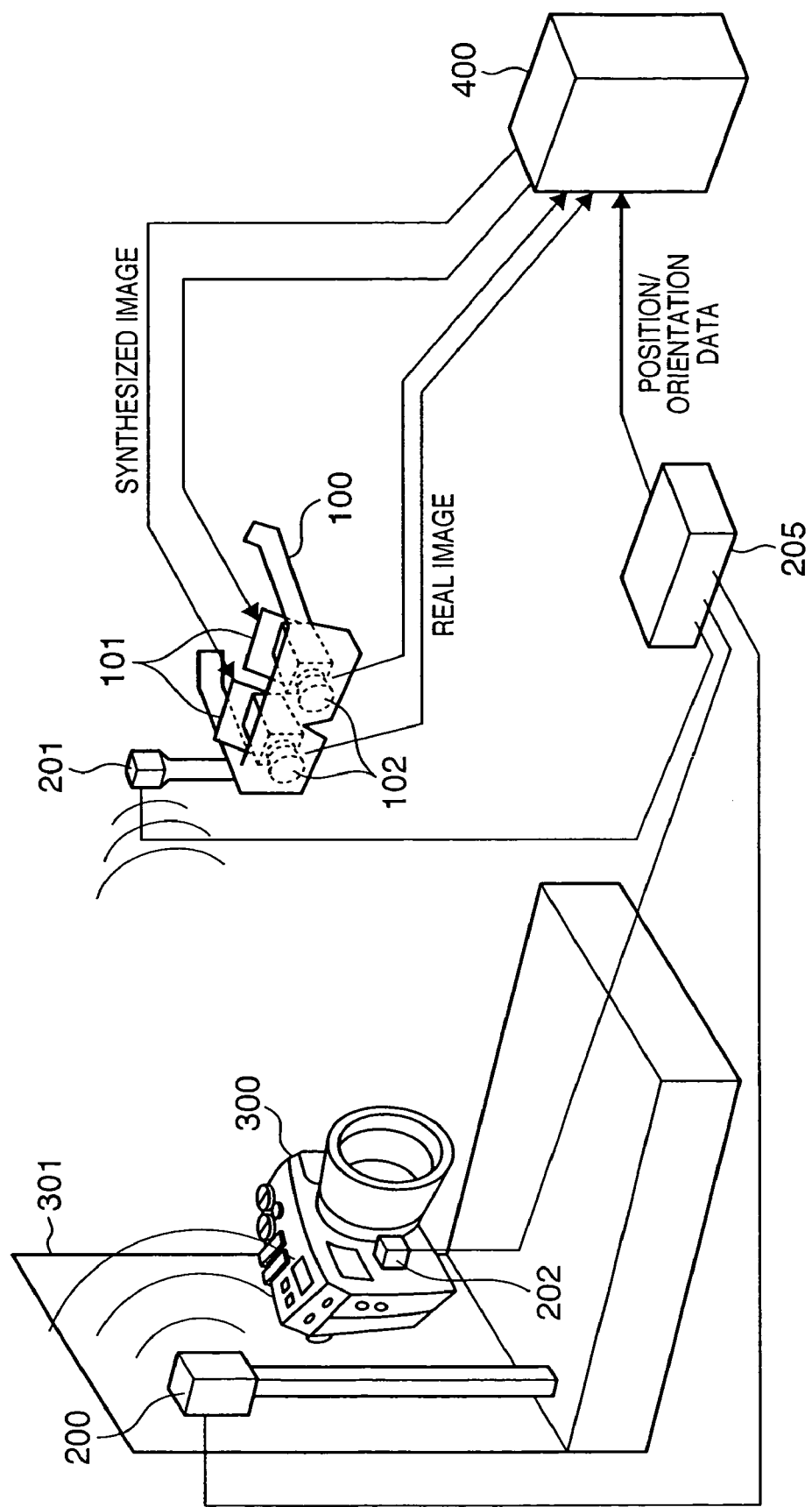
FIG. 1 is a view showing a brief construction of a mixed reality system according to the first embodiment.

The construction of the system according to the first embodiment is shown in FIG. 1.

Referring to FIG. 1, numeral 100 denotes a head mounted type image input/output device (called head mounted display (HMD)), which is mounted to the viewer's head for viewing a synthesized image of real space and virtual space. Numeral 200 denotes a magnetic transmitter which generates a magnetic field; and 201 and 202, a magnetic sensor which senses variation in the magnetic field generated by the magnetic transmitter 200. Numeral 205 denotes a position/orientation tracking device which tracks the position and orientation of the respective magnetic sensors based on sensing results of the magnetic sensors 201 and 202. The magnetic sensor 201 mounted to the HMD 100 is used for calculating the viewer's viewpoint position and visual line direction. Numeral 300 denotes a simple prototype (simple mockup) which is hand-held and operated by the viewer. The simple prototype 300 includes the magnetic sensor 202 as similar to the HMD 100. The position and orientation of the magnetic sensor 202 mounted to the simple prototype 300 is known. Therefore, the position/orientation tracking device 205 calculates the position and orientation of the prototype 300 based on the sensing result of the magnetic sensor 202. Assume that the position and orientation of the magnetic sensor 202 have already been tracked physically and inputted in a data processing apparatus 400. Numeral 301 denotes a platform for viewing the prototype 300.

Numeral 101 denotes an image display device incorporated in the HMD 100, which is provided for the left and right eyes. Numeral 102 denotes an image input device incorporated in the HMD 100, which is also provided for the left and right eyes. Numeral 400 denotes a data processing apparatus, which generates a CG image corresponding to the position and orientation data calculated by the position/orientation tracking device 205, superimposes the CG image on an image inputted by the image input device 102 of the HMD 100, and outputs an obtained synthesized image to the image display device 101 of the HMD 100.

Figure 2:
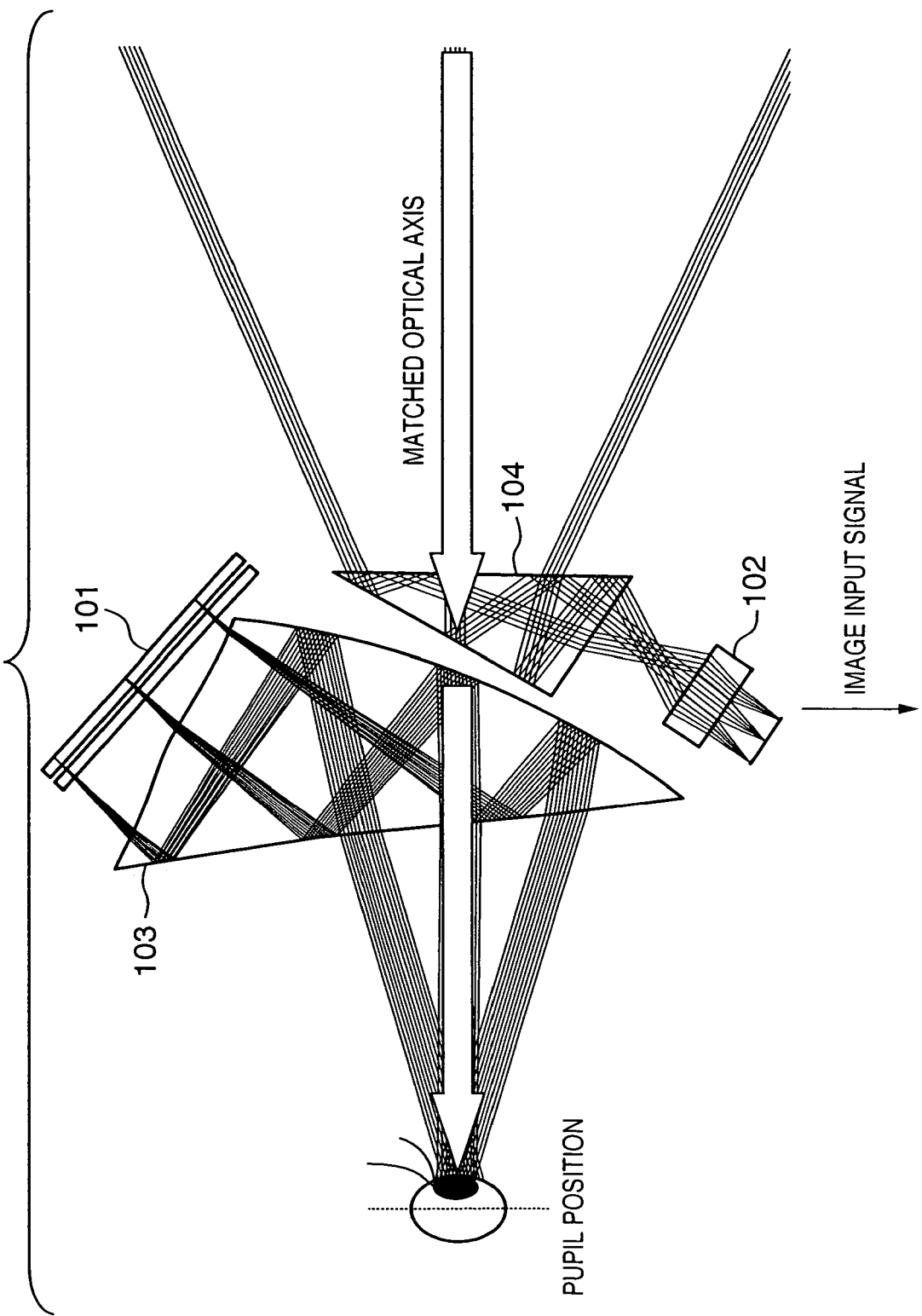
FIG. 2 is a view showing a construction of a head mounted type image input/output device (HMD)

Next, a detailed construction of the HMD 100 is described with reference to FIG. 2. Numeral 101 in FIG. 2 denotes the image display device shown in FIG. 1, which is constructed with a small liquid crystal display device or the like having the size of about 0.5 to several inches. Numeral 103 denotes a free-form surface prism which serves as a lens for enlarging an image in the image display device 101. By these components, an image displayed on the image display device 101 is provided, e.g., as a 90-inch image at a position 2 m away from the viewer.

Numeral 102 denotes the image input device shown in FIG. 1, which is configured with an image sensing device such as a CCD camera, CMOS camera or the like. Numeral 104 denotes an image sensing system prism serving as a lens for converging light from real space to the image input device 102. The image sensing system prism 104 is arranged in the outer side of the free-form surface prism 103 in a manner that the optical axes of both prisms match. By virtue of this arrangement, a parallax between an image inputted by the image input device 102 and an image displayed on the image display device 101 is eliminated, and a real space image can be reproduced without giving sense of oddness.

Next, a detailed construction of the data processing apparatus 400 shown in FIG. 1 is described with reference to FIG. 3.

Numerals 401L and 401R denote an image capturing unit, which captures image data inputted from the image input device 102, converts the image data to a digital signal, and sends the digital signal to the data processing apparatus 400. Numeral 404 denotes a position/orientation data input unit which receives position and orientation data of the HMD 100 and simple prototype 300 transmitted from the position/orientation tracking device 205. Numeral 405 denotes a position/orientation calculating unit which calculates a relative position relation between the HMD 100 and simple prototype 300 based on the input data from the position/orientation data input unit 404.

Numeral 406 denotes 3D-CG rendering data which is to be superimposed on an image of the simple prototype 300. Numeral 407 denotes a CG rendering unit which calculates the position, size, angle (perspective) and the like for rendering CG data for the left eye and the right eye, based on the relative position relation between the HMD 100 and simple prototype 300 calculated by the position/orientation calculating unit 405, and renders the 3D-CG rendering data 406 based on the calculation result.

Numerals 402L and 402R denote an image synthesizing unit which superimposes the CG image generated by the CG rendering unit 407 on the real space image data captured by the image capturing units 401L and 401R. Numerals 403L and 403R denote an image generating unit which converts the synthesized image data to analogue data and outputs the converted data to the image display device 101.

Figure 4:
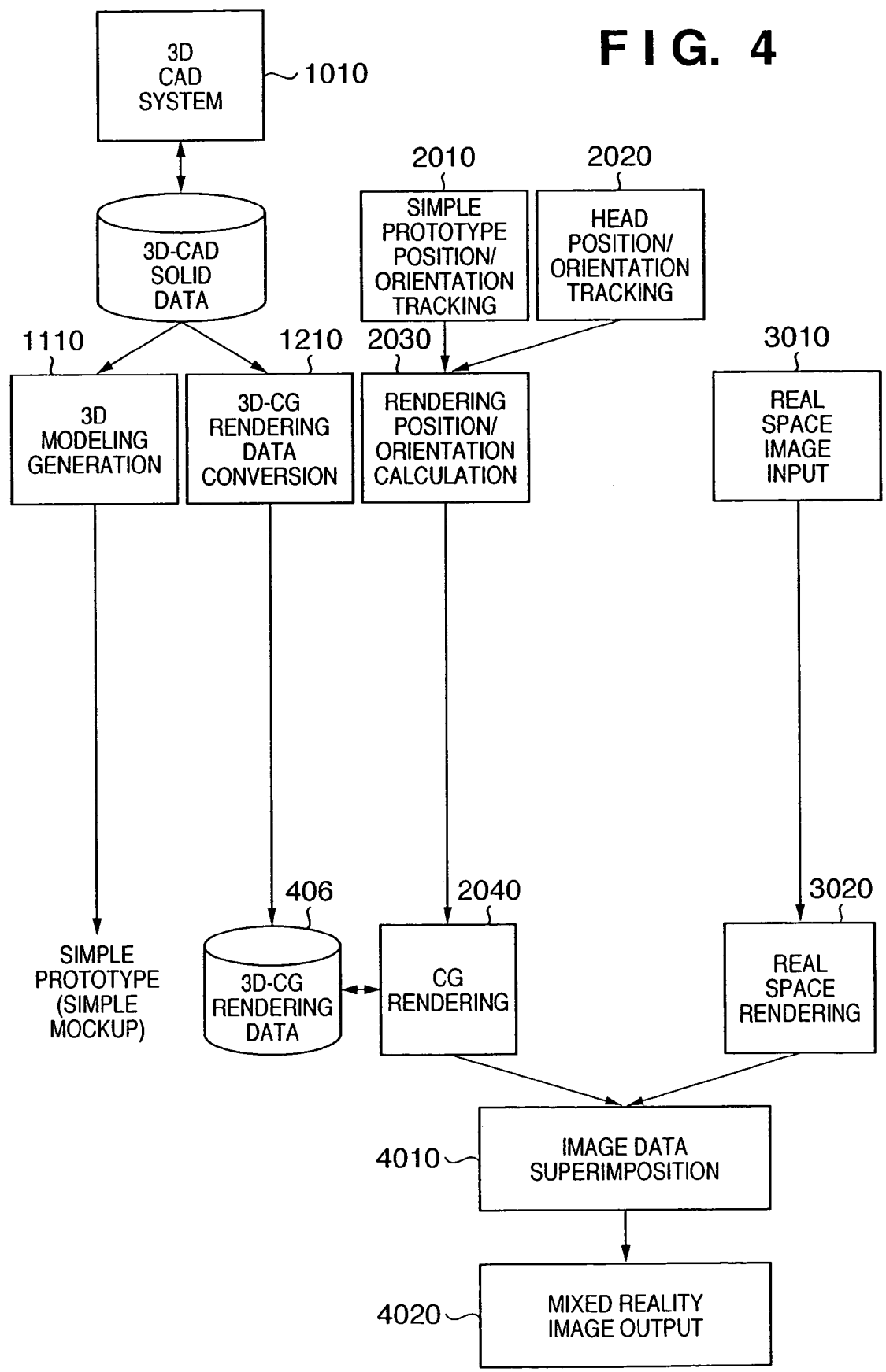
FIG. 4 is a diagram showing a processing flow of the data processing apparatus according to the first embodiment.

The processing flow of the first embodiment having the above-described construction is described with reference to FIG. 4. First, a generation procedure of the simple prototype 300 and the 3D-CG rendering data 406 based on the 3D-CAD data is described with reference to the chart on the left side of FIG. 4.

In a case of designing shapes and designs by a three-dimensional CAD system (1010), designed data is generally stored as solid data that is unique to each 3D-CAD system. The simple prototype 300 is generated based on the solid data by a rapid prototyping device such as optical modeling (1110). Meanwhile, since the 3D solid data is expressed as a group of geometric parameters of each design parts, the 3D solid data as it is cannot be rendered as CG. Therefore, the 3D solid data is converted to a data form appropriate for 3D-CG rendering (e.g., VRML) (1210).

In the mixed reality system according to the first embodiment, virtual space is generated using the 3D-CG rendering data 406 converted in the above-described manner.

Next, a processing procedure of the mixed reality system according to the first embodiment is described with reference to the chart on the right side of FIG. 4.

Using the magnetic transmitter 200 and magnetic sensor 202, the position/orientation tracking device 205 tracks the position and orientation of the simple prototype 300 in real space (2010). Similarly, using data from the magnetic transmitter 200 and magnetic sensor 201, the position/orientation tracking device 205 tracks the position and orientation of the HMD 100 worn by the viewer in real space (2020). The tracking data obtained by the position/orientation tracking device 205 is inputted to the data processing apparatus 400 through the position/orientation data input unit 404. Then, the position/orientation calculating unit 405 calculates a relative position/orientation relation between the HMD 100 and simple prototype 300 (2030).

In parallel with the above-described processes 2010, 2020 and 2030, a real space image from the image input device 102 of the HMD 100 is captured by the data processing apparatus 400 through the image capturing unit 401 (3010). In the CG rendering unit 407, CG is rendered using the relative position relation calculated in process 2030 and the 3D-CG rendering data 406, and the rendered CG is developed in a memory (not shown) such as a video buffer (2040).

Meanwhile, the real space image data captured in process 3010 is also developed in the memory such as a video buffer (3020). The image synthesizing units 402L and 402R superimpose the CG image generated in process 2040 on the image data developed in process 3020 (4010). The synthesized image is converted to a video signal, e.g., analogue signal, by the image generating unit 403 and displayed on the image display device 101 of the HMD 100 (4020).

Figure 5B:
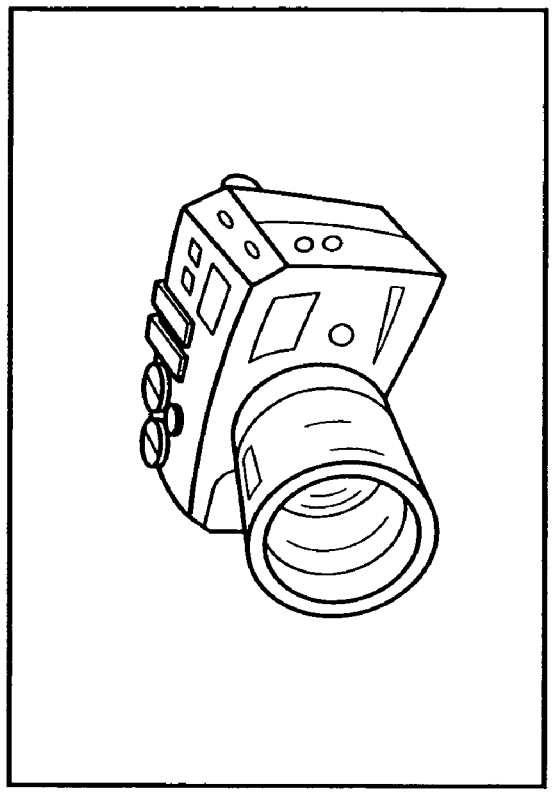
FIGS. 5A and 5B are explanatory views showing a processing result according to the first embodiment.

By repeatedly performing the above-described processes 2010 to 4020 at image update intervals of the image display device 101 or at rendering update intervals of CG rendering process 2040, image data can be provided in real time. An example of the processing result according to this system is shown in FIGS. 5A and 5B.

Figure 5A:
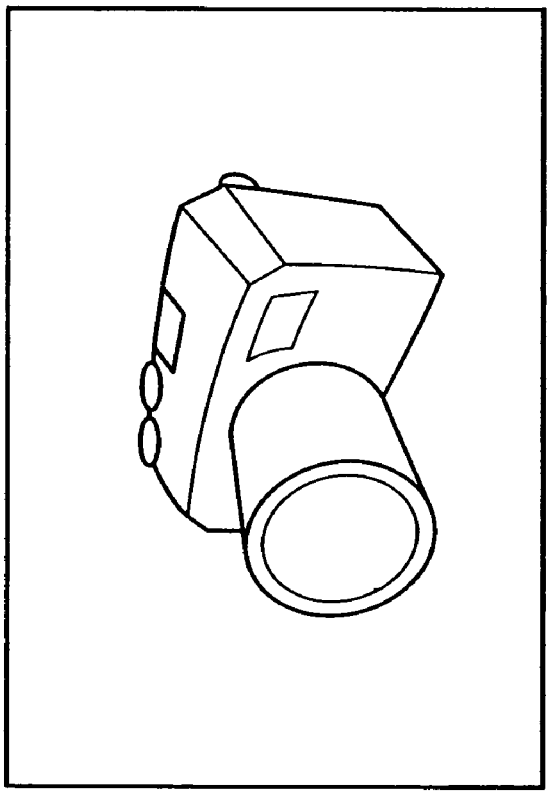

FIG. 5A shows a real space image (a real image of simple prototype 300) which is inputted by the image input device 102 of the HMD 100. FIG. 5B shows an image where a CG image based on CG data is superimposed on the simple prototype 300 in real space, in other words, an image displayed on the image display device 101 of the HMD 100.

Note although the first embodiment describes as an example an apparatus using magnetism as means for tracking the position and orientation, the present invention is not limited to this. Needless to say, the present invention can be realized by other means, such as an optical position/orientation tracking device.

Second Embodiment

The first embodiment has described, as an example, position orientation tracking using magnetism. However, in the position/orientation tracking using magnetism, the tracking precision may become unstable depending on the environment. For instance, if a metal object exists near the magnetic transmitter, the magnetic field is disturbed, resulting in an unstable output value of the magnetic sensor. Furthermore, there is a problem in that, the larger the distance between the magnetic transmitter and the magnetic sensor, the more the tracking precision is deteriorated. Such problem regarding tracking precision is not limited to sensors using magnetism, but occurs in a position/orientation tracking device using various methods. For instance, in a case of optical position/orientation tracking means, there is a problem in that if a shielding object exists between a light emitting device and a light receiving device, the tracking becomes unstable, causing an error.

Figure 6:
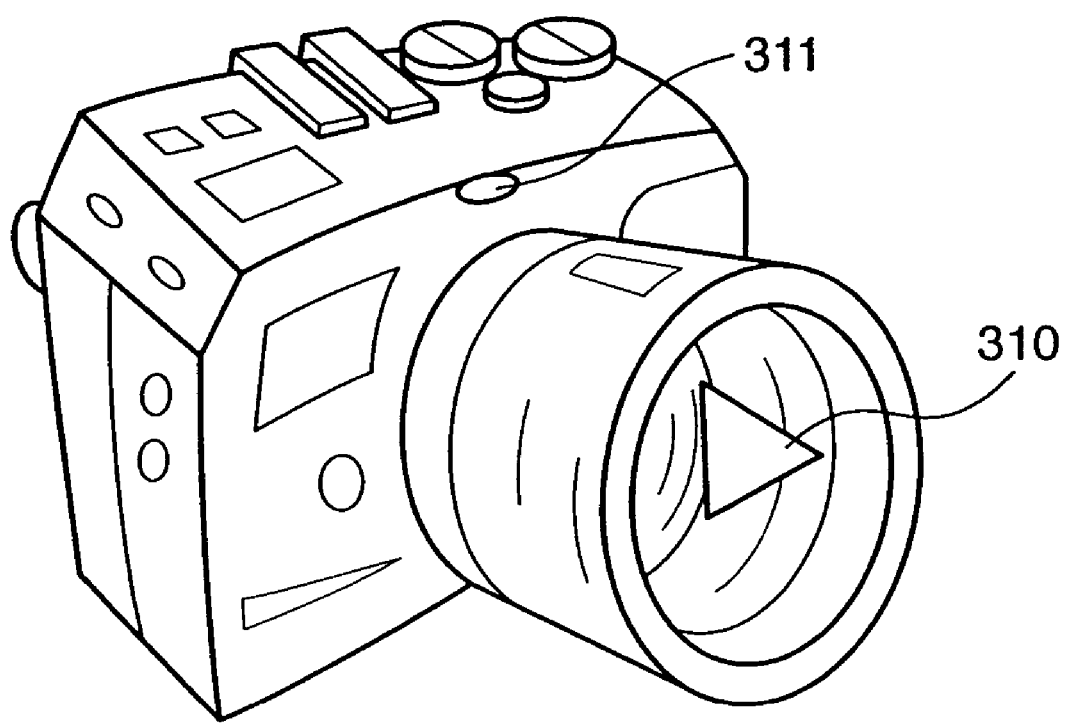
FIG. 6 is an illustration showing an example of a marker attached to a simple prototype according to the second embodiment.

In view of this, the mixed reality system according to the second embodiment corrects the position and orientation using the real space image data captured by the data processing apparatus 400, and improves the tracking precision. For instance, as shown in FIG. 6, an image recognition marker is attached to the simple prototype 300, and the marker is used as a characteristic point. For a marker, various types such as a shape marker 310 or a color marker 311 may be considered based on a position/orientation correction algorithm.

Hereinafter, the position/orientation correction method using the characteristic point is described. As a general correction method, correcting an external parameter of an image input unit (camera) based on one characteristic point is described. Note that the characteristic point may be of a sticker type marker, having information such as a particular color or shape, which is artificially attached to the simple prototype in real space, or may be of a characteristic part of the shape of the simple prototype.

Figure 7:
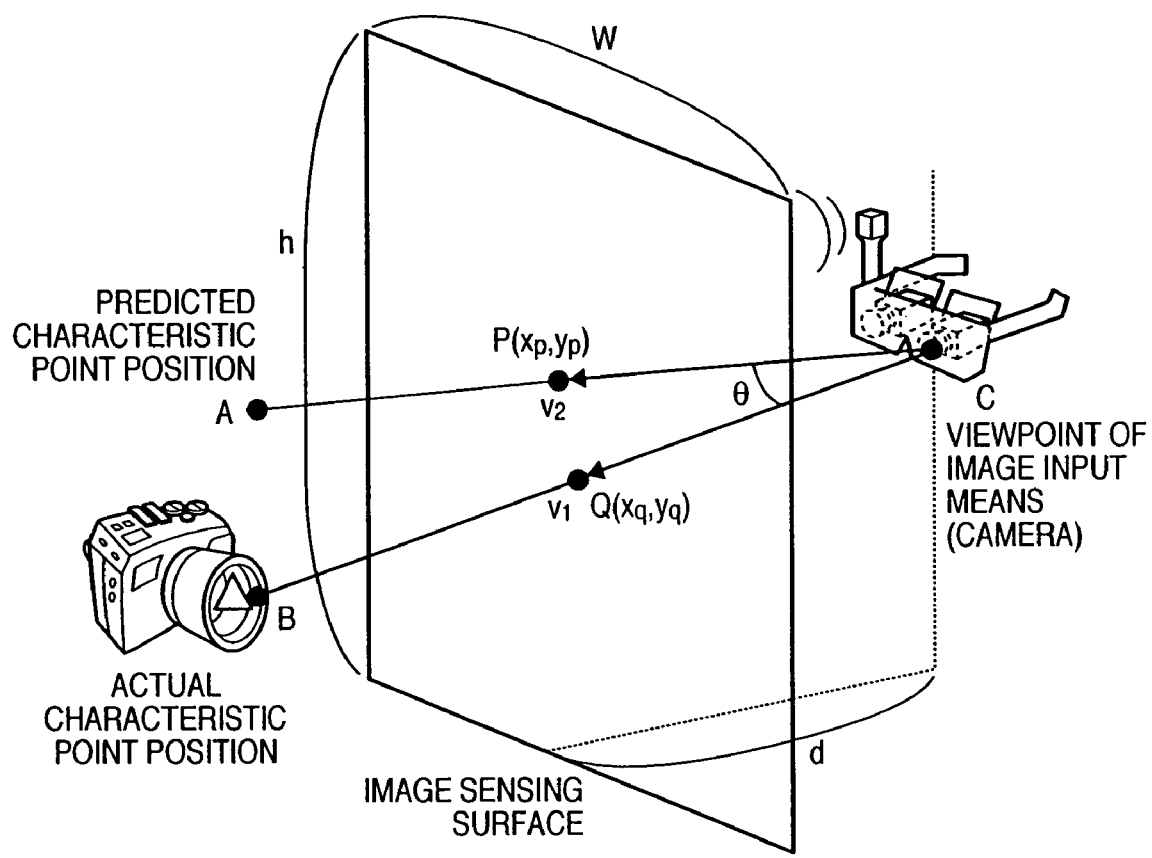
FIG. 7 is an illustration explaining correction of position/orientation tracking using a characteristic point.

FIG. 7 is a schematic view explaining a general correction method of an external parameter (parameter indicative of the position and orientation) of an image input device (camera). In FIG. 7, the point A indicates a predicted position of the characteristic point predicted based on the position and orientation of the image input device (camera) and simple prototype 300; the point B indicates an actual position of the characteristic point; and the point C indicates a viewpoint position of the image input device (camera). Note that the positions represented by the points A and B are positions in a camera coordinate system, and the point C is an origin of the image input device (camera) coordinate system. The point P indicates a position of the point A on the image sensing surface, and the point Q indicates a position of the point B on the image sensing surface. As shown in FIG. 7, assume that the coordinates of the points P and Q are respectively $(x_p, y_p)$ and $(x_q, y_q)$; the width and height of the image sensing surface are represented by w and h; the focal distance of the camera (distance from the image sensing surface to the image input device) is represented by d; $v_1$ denotes a vector from the point C to the point Q; $v_2$ denotes a vector from the point C to the point P; and θ denotes an angle formed by $v_1$ and $v_2$.

First, a description is provided on a method of changing the orientation from the point B direction to the point A direction by the angle θ, with the use of one characteristic point (correction method by rotating the image input device).

Based on the above setting, the vectors $v_1$ and $v_2$ are obtained by the following equation (1):

$$v_1 = \left(x_q - \frac{w}{2}, y_q - \frac{h}{2}, -d\right) \qquad (1)$$

$$v_2 = \left(x_p - \frac{w}{2}, y_p - \frac{h}{2}, -d\right)$$

Next, each of the vectors is normalized to a vector having the size 1 by the following equation (2). Note that |v| indicates the size of the vector v.

$$v'_1 = \frac{v_1}{|v_1|} \quad (2)$$

$$v'_2 = \frac{v_2}{|v_2|}$$

When the image input device (camera) is rotated herein, the rotation axis is a straight line which is orthogonal to a plane formed with the vectors $v_1$, and $v_2$, and passes through the camera viewpoint position (point C). The direction vector of the rotation axis can be obtained by vector product of the vectors $v_1$ and $v_2$ as shown in equation (3) (in reality, normalized vectors ($v_1'$, $v_2'$) are used).

$$v_x = v_1' \times v_2' \quad (3)$$

The vector $v_x$ is a direction vector of the rotation axis, and its component is (l, m, n). Furthermore, the rotation angle θ which is formed by the vectors $v_1$ and $v_2$ can be obtained by the following equation (4):

$$\theta = \arccos(v_1' \cdot v_2') \quad (4)$$

A correction matrix ΔMc used for correcting the orientation by rotation of the image input device is calculated by the following equation (5):

$$\Delta M_c = \quad (5)$$

$$\begin{bmatrix} ll(1-\cos\theta)+\cos\theta & ml(1-\cos\theta)+n\sin\theta & nl(1-\cos\theta)+m\sin\theta & 0 \\ lm(1-\cos\theta)+n\sin\theta & mm(1-\cos\theta)+\cos\theta & nm(1-\cos\theta)+l\sin\theta & 0 \\ ln(1-\cos\theta)+m\sin\theta & mn(1-\cos\theta)+l\sin\theta & nn(1-\cos\theta)+\cos\theta & 0 \\ 0 & 0 & 0 & 1 \end{bmatrix}$$

This correction matrix is multiplied by the matrix representing the position and orientation of the image input device, thereby correcting the position and orientation of the image input device. In other words, the point P is displayed at the position of the point Q, and therefore the landmark position on the image sensing surface which is predicted from the position/orientation parameter coincides with the actual position. Note, although the above description has been given on a correction method using rotation of the image input device (camera), a method of correcting an error by parallel movement of the image input device can also be employed. Furthermore, a correction method using plural characteristic points can achieve a similar effect. Since the concrete steps of this method are apparent from the above description to those who are skilled in the art, description thereof is omitted.

Figure 8:
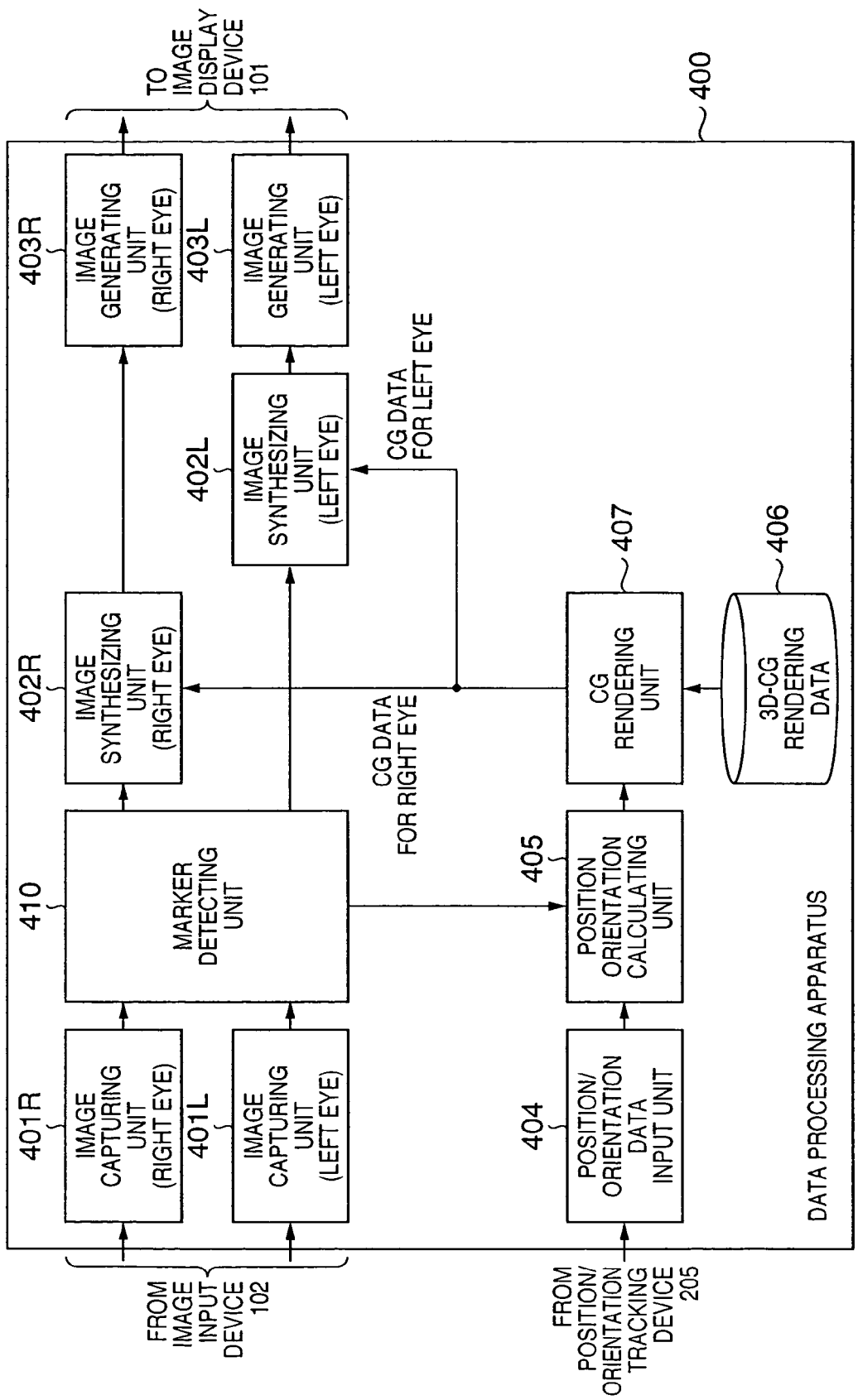
FIG. 8 is a block diagram showing a construction of a data processing apparatus according to the second embodiment.
Figure 9:
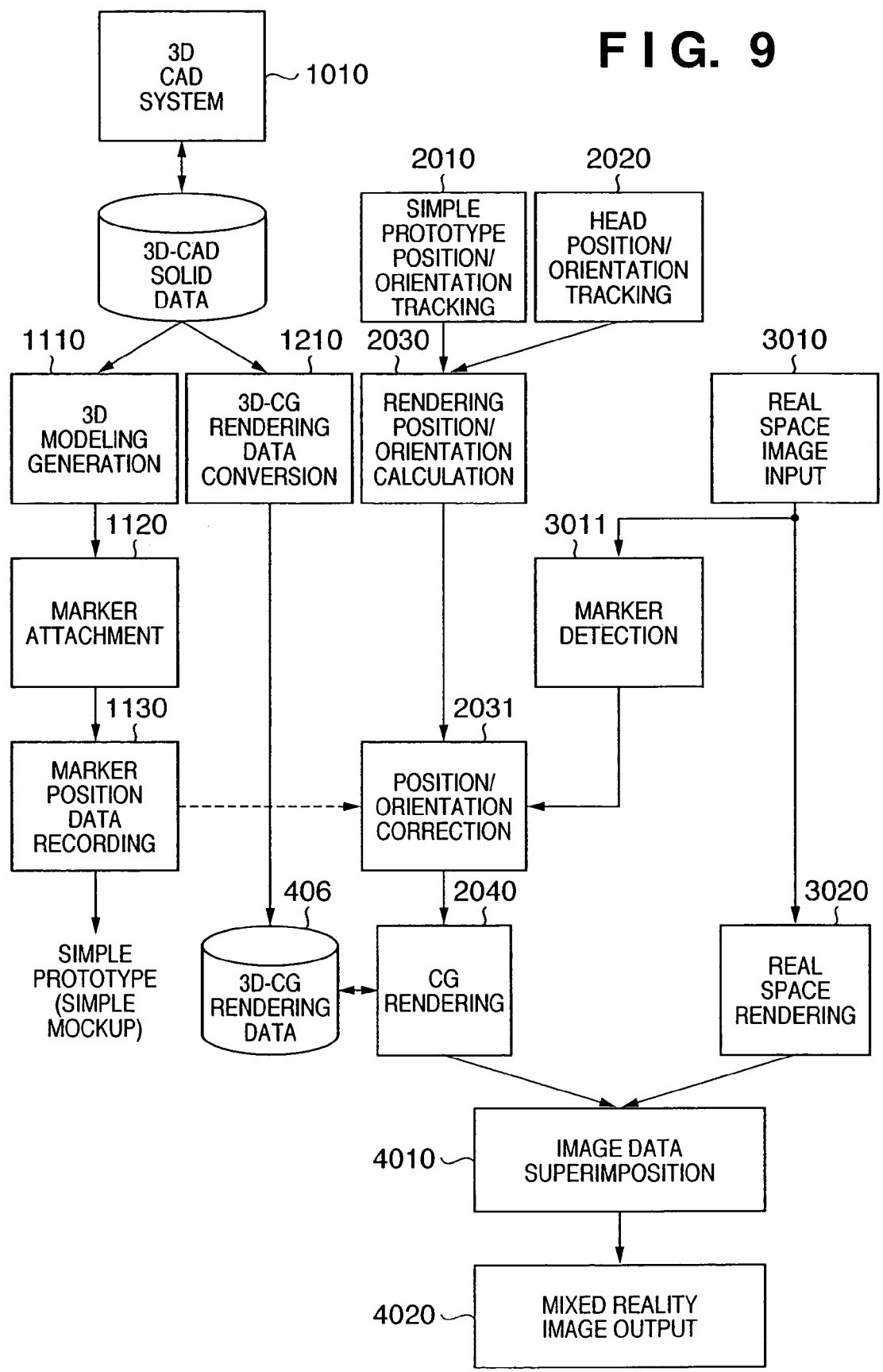
FIG. 9 is a diagram showing a processing flow of the data processing apparatus according to the second embodiment.

Next, the construction and processing flow of the data processing apparatus 400 in the system according to the second embodiment are described with reference to FIGS. 8 and 9. As shown in FIG. 8, the second embodiment comprises a marker detecting unit 410 for detecting a marker from image data obtained by the image capturing units 401L and 401R. A marker detection result of the marker detecting unit 410, i.e., the coordinate value of the point Q in FIG. 7, is transmitted to the position/orientation calculating unit 405. In the position/orientation calculating unit 405, the position and orientation are corrected using the coordinate value of the point Q in the manner described with reference to FIG. 7. Other constructions are the same as that of the first embodiment (FIG. 3).

The processing flow of the second embodiment is now described with reference to FIG. 9. For the same processing as that of the first embodiment (FIG. 4), the same reference numerals are assigned.

A marker is attached (1120) to the simple prototype 300 which is generated in process 1110 based on the 3D solid data by a rapid prototyping device such as optical modeling. The position data where the marker is attached is recorded (1130). Note that the position data of the marker may be three-dimensional data tracked by a separate tracking device. In a case of utilizing a characteristic point, the position of the characteristic point can be acquired from CAD data. Further, by generating CAD data so as to form a mark designating the marker's attachment position on the simple prototype, it is possible to acquire marker's position data from the CAD data.

In the meantime, in the processing of the mixed reality system, real space image data is captured by the data processing apparatus 400 in process 3010, and the position of the marker attached to the simple prototype 300 is extracted from the real space image data by the marker detecting unit 410 (3011). Using the marker position data recorded in advance in process 1130 and the marker position data extracted from the image data in process 3011, the relative position/orientation relation between the HMD 100 and simple prototype 300, which has been calculated in process 2030 based on the tracking result of the position/orientation tracking device 205, is corrected (2031). In process 2040, CG rendering is performed using the corrected data.

Third Embodiment

In the above-described first and second embodiments, the image synthesizing unit 402 superimposes (overwrites) the virtual space image (CG image) data on the real space image data, thereby generating a synthesized image. In this case, because an object that is supposed to be in front of the CG image is overwritten by the CG image, a contradiction occurs between the depth representations of a CG image and a real object. The contradiction is described in detail with reference to FIGS. 10A to 10D.

Figure 10A:
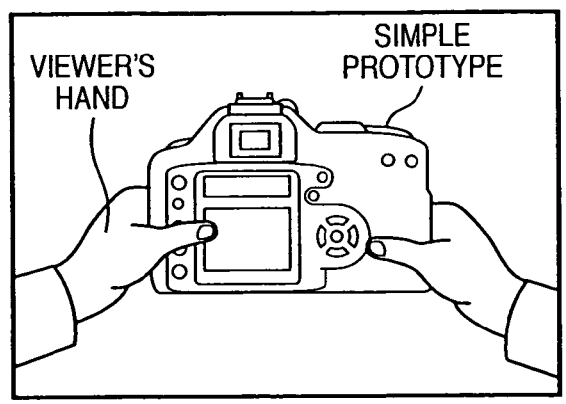
FIGS. 10A to 10D are illustration explaining a CG image correction method realized by extracting a hand area.
Figure 10B:
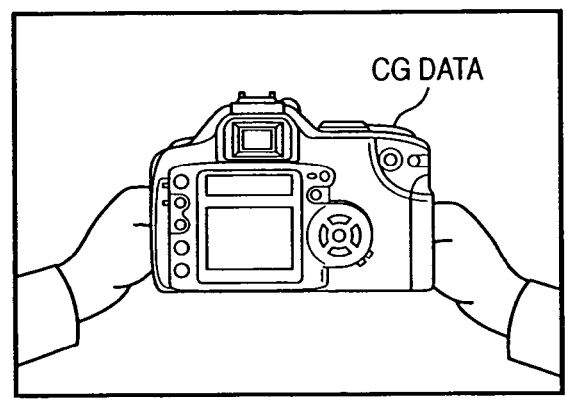
Figure 10C:
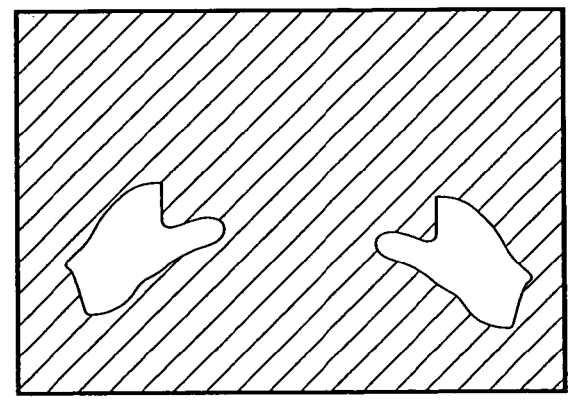

FIG. 10A shows an example of real space image data inputted by the image input device 102, which is a simple prototype held by viewer's hands. A part of the hands (thumbs) is shown in front of (before) the prototype. If a CG image corresponding to the simple prototype is superimposed on this image, a synthesized image shown in FIG. 10B is displayed. In other words, the part of the hands that should exist in front of (before) the simple prototype is hidden by the CG image, causing contradiction in depth representation. This presents an image that gives sense of oddness to the viewer.

Figure 10D:
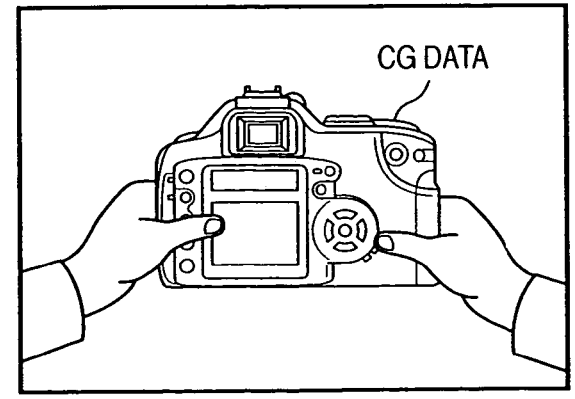

In view of this, the mixed reality system according to the third embodiment performs image processing on the real space image data captured by the data processing apparatus 400 to eliminate the above-described contradiction of the depth representation. More specifically, the image data (FIG. 10A) obtained by the image input device 102 is subjected to image processing to extract the area of hands. From the extracted hand area, a mask image (FIG. 10C) is generated. A CG image is generated with respect to the area other than the hand area designated by the mask image, and superimposed on the real space image. As a result, the hand area is displayed in front of (before) the prototype as shown in FIG. 10D, thus eliminating the oddness of the depth representation.

Figure 11:
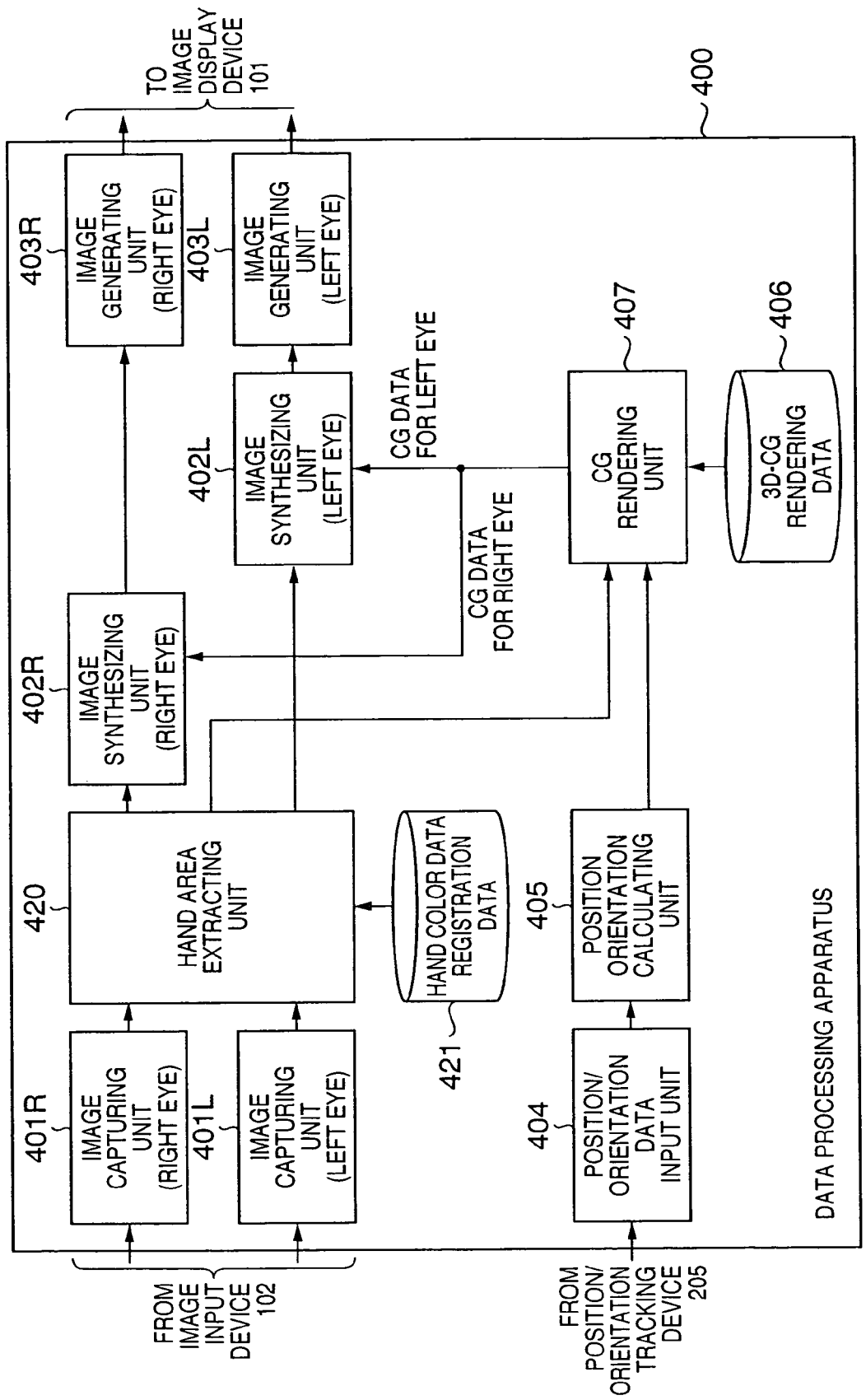
FIG. 11 is a block diagram showing a construction of a data processing apparatus according to the third embodiment.

The construction and processing flow of the system according to the third embodiment are described with reference to FIGS. 11 and 12. As shown in FIG. 11, the third embodiment comprises a hand area extracting unit 420 and a hand color data registration data 421 in addition to the construction of the first embodiment (FIG. 3). The hand area extracting unit 420 extracts, as a hand area, an area having the color, which is registered in the hand color data registration data 421, from the image data obtained by the image capturing units 401L and 401R. The CG rendering unit 407 prohibits CG-image rendering with respect to the hand area extracted by the hand area extracting unit 402. Other constructions are the same as that of the first embodiment (FIG. 3).

Figure 12:
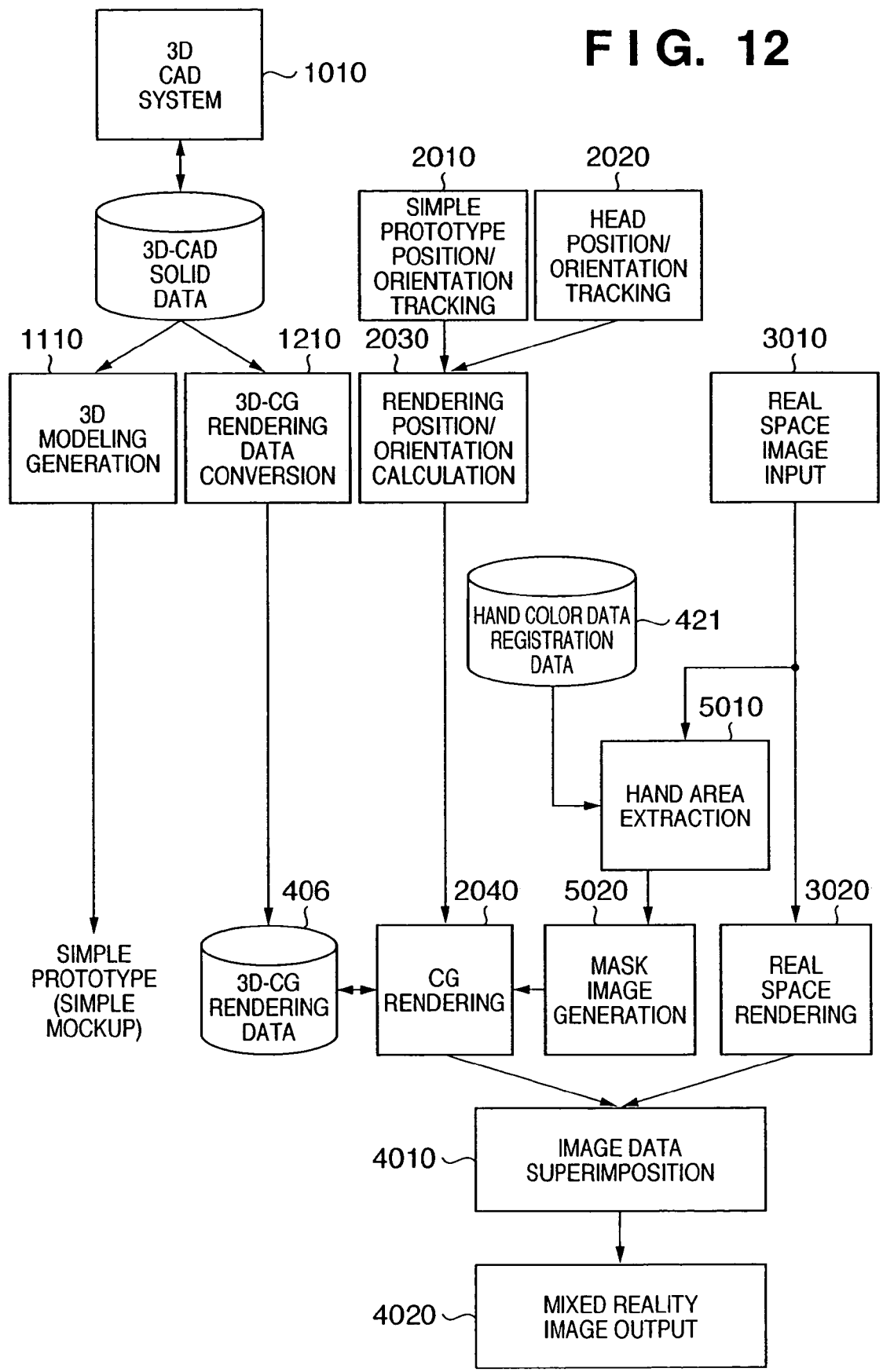
FIG. 12 is a diagram showing a processing flow of the data processing apparatus according to the third embodiment.

FIG. 12 shows a processing flow according to the third embodiment. In addition to the processes of the first embodiment (FIG. 4), processes 5010 and 5020 are added.

Upon capturing the real space image data by the image capturing unit 401 of the data processing apparatus 400 in process 3010, the hand area extracting unit 420 compares color data of each pixel with the color data of the hand area which has been registered in advance in the hand color data registration data 421. If the pixel matches the color data of the hand area, it is considered that the color of the pixel is a human's flesh color and that the pixel is a hand area (5010). With respect to all pixels, the determination is made as to whether or not the pixel is a hand area. The pixels determined as a hand area are extracted, and only the hand area data is recorded in the memory such as a video buffer for mask image generation (5020). In the CG rendering unit 407, a CG image is generated (2040) for an area masked by the mask image generated in process 5020. In the image synthesizing unit 402, the CG image generated in process 2040 is superimposed on the real space image data (4010).

By generating a synthesized image in the foregoing manner, a real space image which is supposed to be in front of (before) CG data can be displayed in front of (before) the CG data. Therefore, it is possible to eliminate the oddness of the depth representation.

Fourth Embodiment

In the first to third embodiments, the brightness and color tone of the CG generated based on 3D-CAD data are determined based on light source data or the like included in the 3D-CAD data. However, the light source data of the CAD data does not always fit in the real space. For instance, if the real space is dark, the brightness of the CG has to be reduced; otherwise, the CG image looks isolated from the real space and does not create a natural synthesized image. In view of this, according to the fourth embodiment, when a CG image is superimposed on a real space image, various parameters for CG rendering are set based on the real space image data captured by the data processing apparatus 400. As a result, the CG's brightness and color tones can be matched with the real space environment, making it possible to generate a less odd synthesized image. Hereinafter, the construction and processing flow of the fourth embodiment are described with reference to FIGS. 13 and 14.

Figure 3:
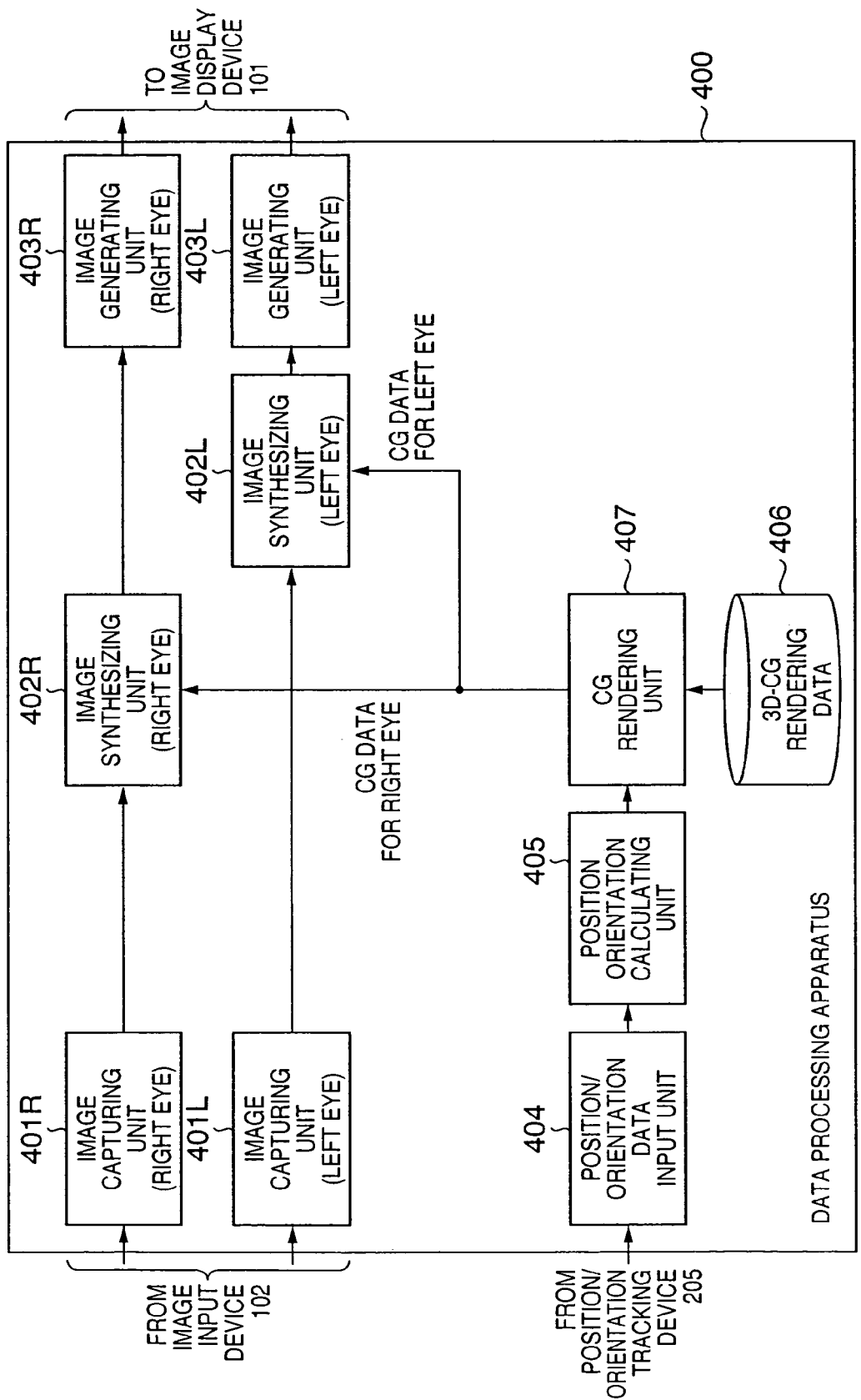
FIG. 3 is a block diagram showing a construction of a data processing apparatus according to the first embodiment.
Figure 13:
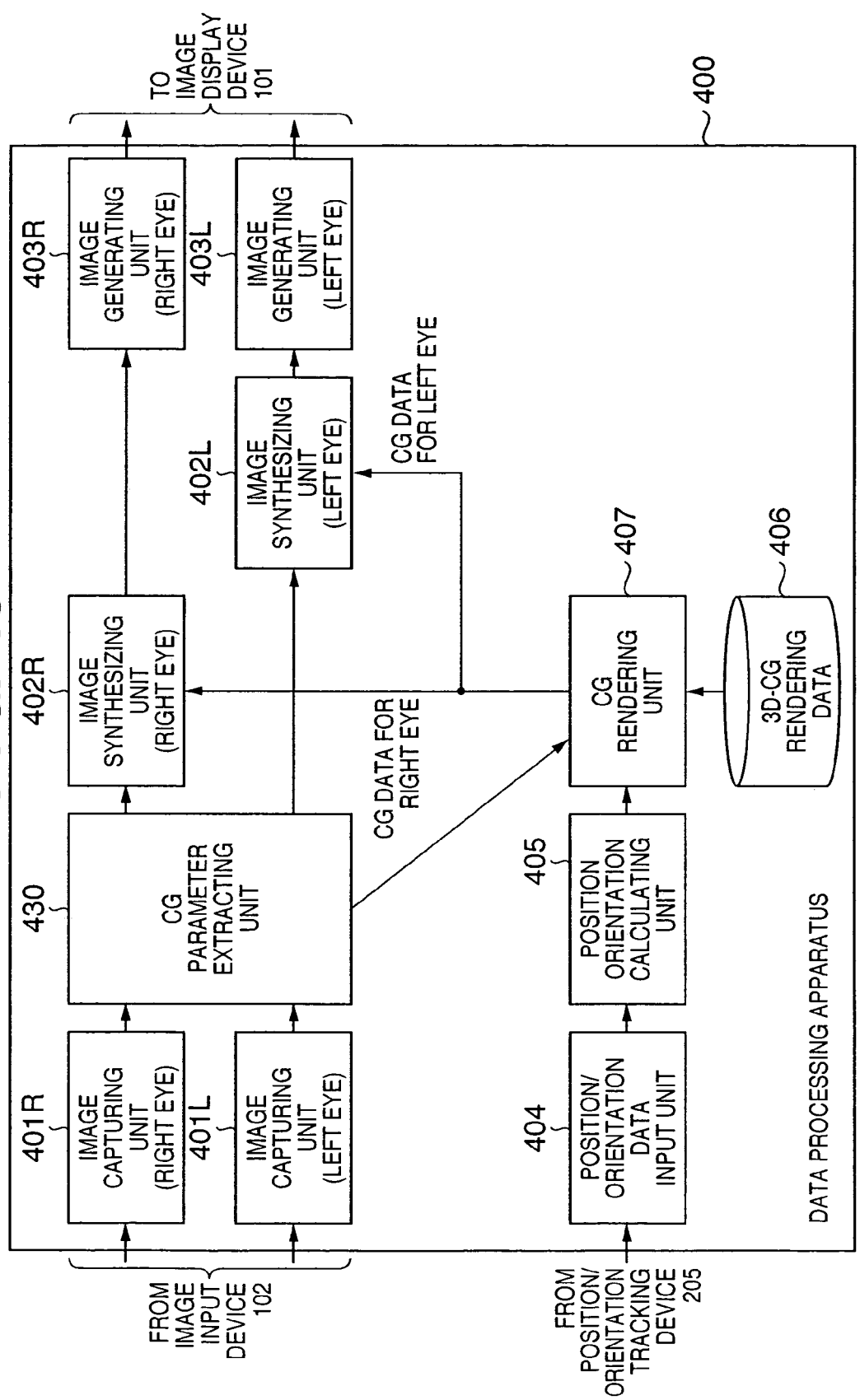
FIG. 13 is a block diagram showing a construction of a data processing apparatus according to the fourth embodiment.
Figure 14:
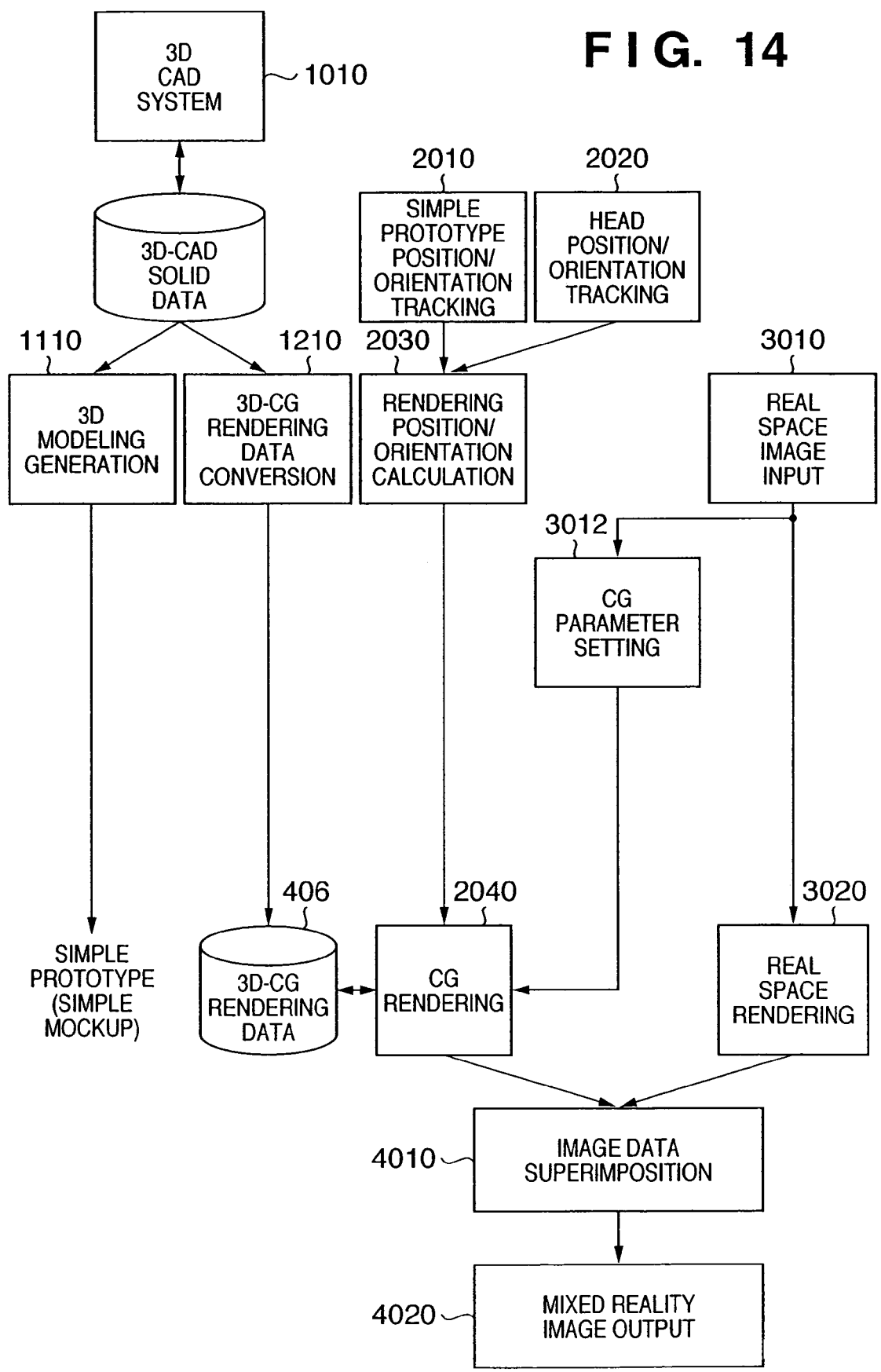
FIG. 14 is a diagram showing a processing flow of the data processing apparatus according to the fourth embodiment.

As shown in FIG. 13, the fourth embodiment comprises a CG parameter extracting unit 430 in addition to the construction of the first embodiment (FIG. 3). Further in FIG. 14 showing the process according to the fourth embodiment, CG parameter setting process 3012 is added to the processes of the first embodiment. The CG parameter extracting unit 430 grasps the real space environment from the real space image data inputted through the image capturing units 401L and 401R, and sets parameters for rendering a CG image, e.g., brightness, color tones and so on (3012). In the CG rendering unit 407, a CG image is rendered based on the parameters acquired from the CG parameter extracting unit 430 and the 3D-CG data (2040). In the image synthesizing unit 402, the CG image is superimposed on the real space image data (4010).

To be more specific, setting the parameters for rendering a CG image, e.g., brightness, color tones and so on, is to change a value of a CG data attribute. For instance, when CG data is rendered, it is necessary to set from where and what kind of illumination is thrown at an object (parameter setting of light in virtual space). In this stage, by setting parameters such as a material of a CG object, a position, intensity and color of the light source that illuminates the CG object, it is possible to adjust the brightness and color tones in CG rendering. Furthermore, in mixed reality (MR), it is necessary to adjust brightness of a CG image in accordance with the brightness of the inputted real space. For instance, if the real space is rather dark, rather dark setting is applied to the CG object. When they are badly balanced, only the CG object becomes prominent in the mixed reality, or the CG object is submerged in the mixed reality. Since the fourth embodiment captures the real space image as a video image, for instance, an average of the brightness and color tones of the captured image is obtained (or the brightness and color tone of a predetermined area may be obtained), and the aforementioned lighting parameters are adjusted in accordance with the average value, thereby adjusting the brightness and color tones for CG rendering.

As described above, according to the fourth embodiment, by extracting parameters used for CG rendering from real space data, it is possible to generate a synthesized image that matches the real space environment.

Fifth Embodiment

Figure 15A:
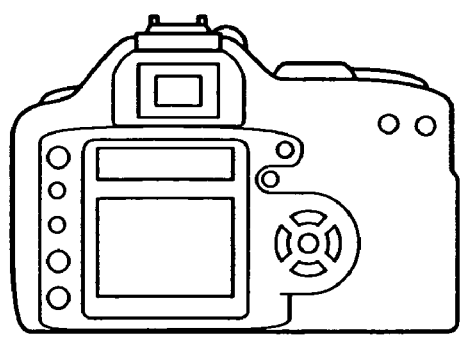
FIGS. 15A to 15D are illustrations explaining an influence of distortion of an image input system.
Figure 15B:
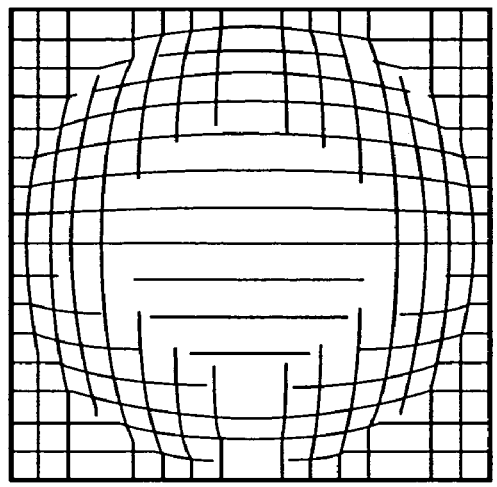
Figure 15C:
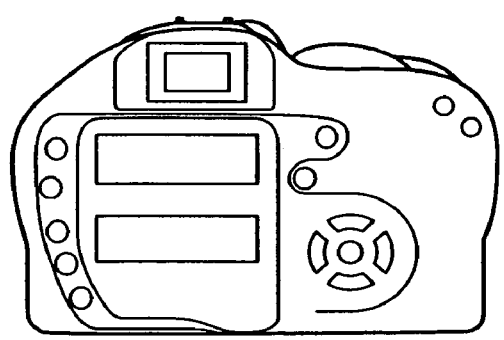
Figure 15D:
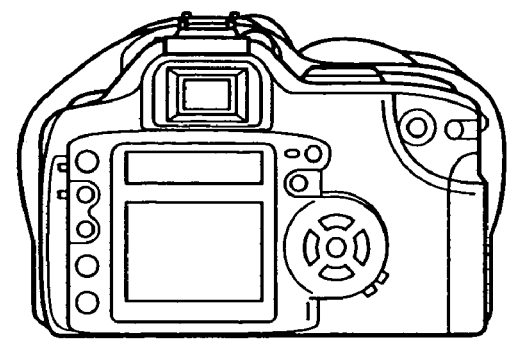

Since a real space image inputted from the image input device 102 goes through the image sensing system prism 104, there is a possibility that the image includes optical distortion. For instance, FIG. 15A shows the simple prototype 300 placed in real space. When the simple prototype 300 goes through the image sensing system prism 104 having a distortion amount shown in FIG. 15B, a distorted object shown in FIG. 15C is inputted by the image input device. If a CG image is superimposed on the distorted image, the CG image does not accurately overlap the prototype in real space as shown in FIG. 15D, resulting in a synthesized image that gives sense of oddness to a viewer.

In the mixed reality system according to the fifth embodiment, the distortion of image data in real space captured by the data processing apparatus 400 is removed by image processing, and a less odd synthesized image is provided. The construction and processing flow of the data processing apparatus 400 according to the fifth embodiment are described with reference to FIGS. 16 and 17.

Figure 16:
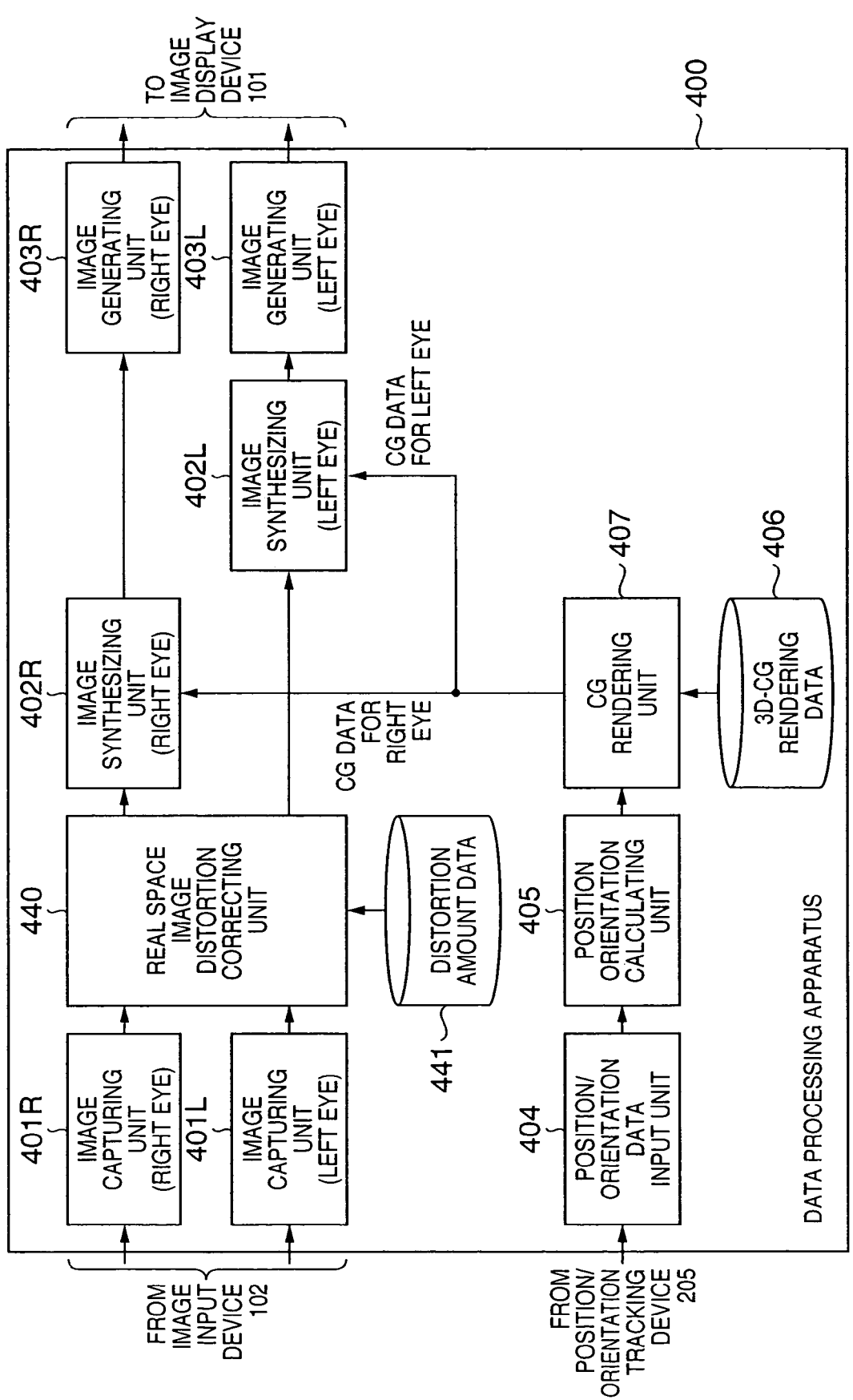
FIG. 16 is a block diagram showing a construction of a data processing apparatus according to the fifth embodiment.
Figure 17:
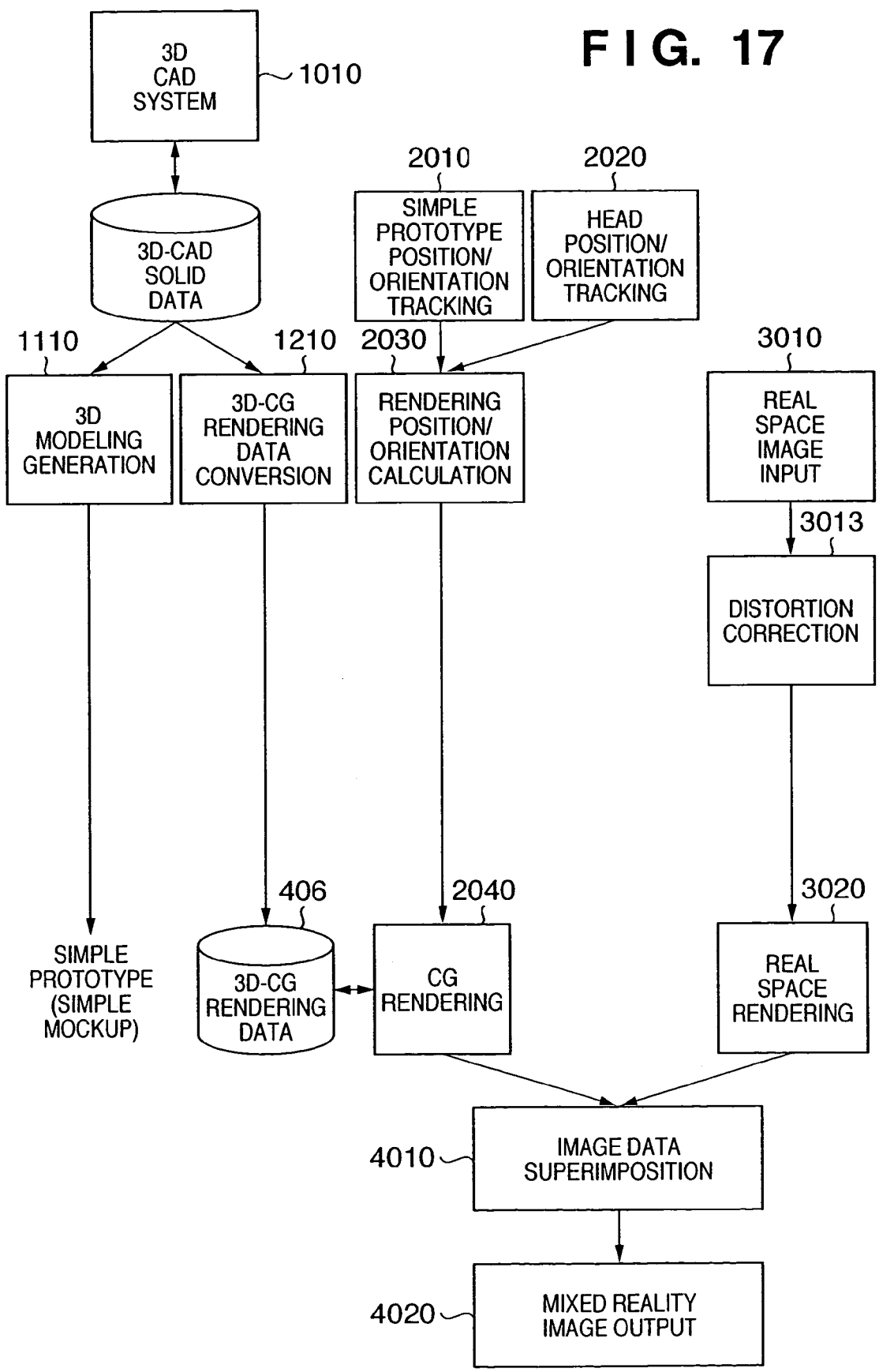
FIG. 17 is a diagram showing a processing flow of the data processing apparatus according to the fifth embodiment.

As shown in FIG. 16, the fifth embodiment comprises a real space image distortion correcting unit 440 and distortion amount data 441 in addition to the construction of the first embodiment (FIG. 3). Furthermore, as shown in FIG. 17, distortion correction process 3013 is added to the processes of the first embodiment (FIG. 4).

The real space image distortion correcting unit 440 corrects a distortion of real space image data. Using the distortion amount data 441 of the image input system which is measured in advance and stored, the correcting unit 440 corrects image data inputted from the image capturing units 401L and 401R (3013). By virtue of this processing, the simple prototype in real space accurately overlaps the CG image, and therefore a viewer can view a natural synthesized image. More specifically, since real space is inputted to the system as image data and the real space image is converted to an image which is appropriate for being synthesized with a virtual space image (CG), it is possible to generate a mixed reality image which is natural to a viewer.

Note that each of the above-described embodiments can be realized independently, or in appropriate combination.

As has been described above, in the mixed reality system according to each of the above embodiments, it is possible to superimpose 3D-CG data generated by converting 3D-CAD data on an image of a simple prototype (simple mockup) generated by a rapid prototyping device or the like based on the 3D-CAD data with a matched position and orientation, and the synthesized image can be displayed. This system realizes both visual evaluation and tactual evaluation, and enables evaluation under the condition close to a finished product. Furthermore, since real space is inputted to the system as image data and the real space image can be converted to an image appropriate for being synthesized with a virtual space image, it is possible to generate an image which is natural to a viewer.

Further, the object of the present invention can be achieved by providing a storage medium storing program codes of a software realizing the functions of the above-described embodiments to a computer system or apparatus, reading the program codes, by a computer (CPU or MPU) of the computer system or apparatus, from the storage medium, then executing the program.

In this case, the program codes read from the storage medium realize the functions according to the embodiments, and the storage medium storing the program codes constitutes the invention.

The storage medium, such as a flexible disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire processes in accordance with designations of the program codes and realizes functions of the above embodiments.

According to the above-described configuration of the embodiments, it is possible to superimpose a computer graphic image generated based on 3D-CAD data on a real image of a simple prototype generated based on the 3D-CAD data, and display the synthesized image. Therefore, design data can be evaluated under the condition close to a finished product.

The present invention is not limited to the above embodiment and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-341628 filed on Sep. 30, 2003, which is hereby incorporated by reference.

What is claimed is:

1. An image display method of superimposing image data of virtual space on image data of real space at an arbitrary viewpoint and exhibiting a superimposed image to a viewer, comprising:

an image sensing step of capturing, by an image sensing device, image data of real space in which a prototype made based on three-dimensional CAD data exists;

a tracking step of tracking positions and orientations of the image sensing device and the prototype, and acquiring position/orientation data indicative of the position and orientation of the prototype in the image data captured in said image sensing step;

a synthesizing step of rendering a three-dimensional computer graphic image corresponding to the prototype based on the position/orientation data and the three-dimensional CAD data so as to overlap the prototype in the image captured in said image sensing step; and an area extracting step of extracting an area, having predetermined color data, from the image of a real space obtained in said image sensing step, wherein, in said synthesizing step, rendering the three-dimensional computer graphic image is prohibited in the area extracted in said area extracting step.

2. An image display method of superimposing image data of virtual space on image data of real space at an arbitrary viewpoint and exhibiting a superimposed image to a viewer, comprising:

an image sensing step of capturing, by an image sensing device, image data of real space in which a prototype made based on three-dimensional CAD data exists;

a tracking step of tracking positions and orientations of the image sensing device and the prototype, and acquiring position/orientation data indicative of the position and orientation of the prototype in the image data captured in said image sensing step;

a synthesizing step of rendering a three-dimensional computer graphic image corresponding to the prototype based on the position/orientation data and the three-dimensional CAD data so as to overlap the prototype in the image captured in said image sensing step; and a parameter generating step of generating a rendering parameter regarding an environment of a real space, for the three-dimensional computer graphic image based on the image obtained in said image sensing step, wherein in said synthesizing step, the three-dimensional computer graphic image is rendered using the rendering parameter generated in said parameter generating step.

3. An image display apparatus for superimposing image data of virtual space on image data of real space at an arbitrary viewpoint and exhibiting a superimposed image to a viewer, comprising:

an image sensing unit configured to capture image data of real space in which a prototype made based on three-dimensional CAD data exists;

a tracking unit configured to track positions and orientations of said image sensing unit and the prototype, and acquire position/orientation data indicative of the position and orientation of the prototype in the image data captured by said image sensing unit;

a synthesizing unit configured to render a three-dimensional computer graphic image corresponding to the prototype based on the position/orientation data and the three-dimensional CAD data so as to overlap the prototype in the image captured by said image sensing unit; and an area extracting unit configured to extract an area, having predetermined color data, from the image of a real space obtained by said image sensing unit, wherein said synthesizing unit prohibits rendering the three-dimensional computer graphic image in the area extracted by said area extracting unit.

4. An image display apparatus for superimposing image data of virtual space on image data of real space at an arbitrary viewpoint and exhibiting a superimposed image to a viewer, comprising:

an image sensing unit configured to capture image data of real space in which a prototype made based on three-dimensional CAD data exists;

a tracking unit configured to track positions and orientations of said image sensing unit and the prototype, and acquire position/orientation data indicative of the position and orientation of the prototype in the image data captured by said image sensing unit;

a synthesizing unit configured to render a three-dimensional computer graphic image corresponding to the prototype based on the position/orientation data and the three-dimensional CAD data so as to overlap the prototype in the image captured by said image sensing unit; and a parameter generating unit configured to generate a rendering parameter regarding an environment of a real space, for the three-dimensional computer graphic image based on the image obtained by said image sensing unit, wherein said synthesizing unit renders the three-dimensional computer graphic image using the rendering parameter generated by said parameter generating unit.

5. A control program for realizing by a computer the image display method described in claim 1.

* * * * *

UNITED STATES PATENT AND TRADEMARK OFFICE
CERTIFICATE OF CORRECTION

PATENT NO. : 7,312,795 B2
APPLICATION NO. : 10/945994
DATED : December 25, 2007
INVENTOR(S) : Takashi Aso et al.

Page 1 of 1

It is certified that error appears in the above-identified patent and that said Letters Patent is hereby corrected as shown below:

COLUMN 2

Line 53, "illustration" should read --illustrations--.

COLUMN 5

Line 50, "Note" should read --Note that--.

COLUMN 12

Line 55, "wherein" should read --wherein,--.

Signed and Sealed this

Twenty-third Day of September, 2008

JON W. DUDAS
*Director of the United States Patent and Trademark Office*